United States Patent [19]
Philipp et al.

[11] Patent Number: 5,265,574
[45] Date of Patent: Nov. 30, 1993

[54] ADAPTIVE ACCELERATION KNOCK CONTROL

[75] Inventors: Matthias Philipp, Stuttgart; Stefan Unland, Schwieberdingen, both of Fed. Rep. of Germany

[73] Assignee: Robert Bosch GmbH, Stuttgart, Fed. Rep. of Germany

[21] Appl. No.: 688,956
[22] PCT Filed: Dec. 24, 1988
[86] PCT No.: PCT/EP88/01202
 § 371 Date: May 13, 1991
 § 102(e) Date: May 13, 1991
[87] PCT Pub. No.: WO90/07644
 PCT Pub. Date: Jul. 12, 1990
[51] Int. Cl.⁵ .............................................. F02P 5/15
[52] U.S. Cl. .................................... 123/422; 123/425
[58] Field of Search ......................... 123/422, 423, 425; 364/431.08

[56] References Cited

U.S. PATENT DOCUMENTS

| | | | |
|---|---|---|---|
| 4,343,278 | 8/1982 | Asano | 123/422 X |
| 4,422,422 | 12/1983 | Mowery et al. | 123/425 |
| 4,448,163 | 5/1984 | Yoshida | 123/422 |
| 4,513,716 | 4/1985 | Haraguchi et al. | 123/422 X |
| 4,640,249 | 2/1987 | Kawamura et al. | 123/425 |
| 4,766,545 | 8/1988 | Nagai | 123/422 X |
| 4,790,281 | 12/1988 | Mieno et al. | 123/422 X |
| 4,819,599 | 4/1989 | Chemnitzer | 123/422 X |
| 4,852,537 | 8/1989 | Nagano et al. | 123/422 X |

FOREIGN PATENT DOCUMENTS

| | | |
|---|---|---|
| 84368 | 7/1983 | European Pat. Off. |
| 95081 | 11/1983 | European Pat. Off. |
| 191378 | 8/1986 | European Pat. Off. |
| 2498255 | 7/1982 | France |

Primary Examiner—Willis R. Wolfe
Attorney, Agent, or Firm—Michael J. Striker

[57] ABSTRACT

For eliminating acceleration knocking in spark ignition engines, the ignition is retarded when the engine is in dynamic operation by an amount which is optimized for the ambient conditions present at the start of each dynamic operation. The occurrence of knocking of the engine during acceleration is detected, and the amount of change of an engine operation parameter for a next acceleration is adjusted depending on whether or not the knocking during acceleration is occurring.

8 Claims, 2 Drawing Sheets

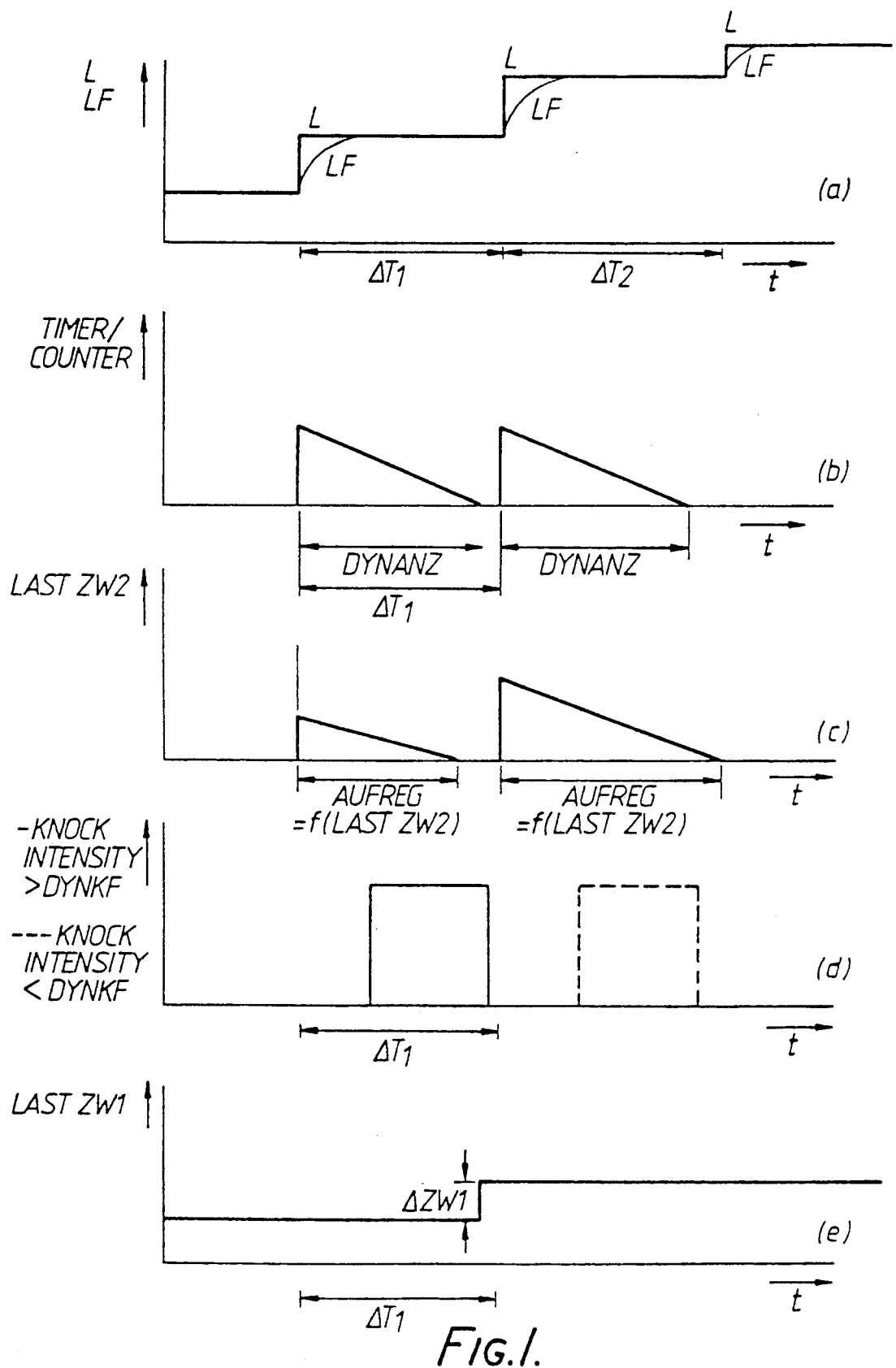

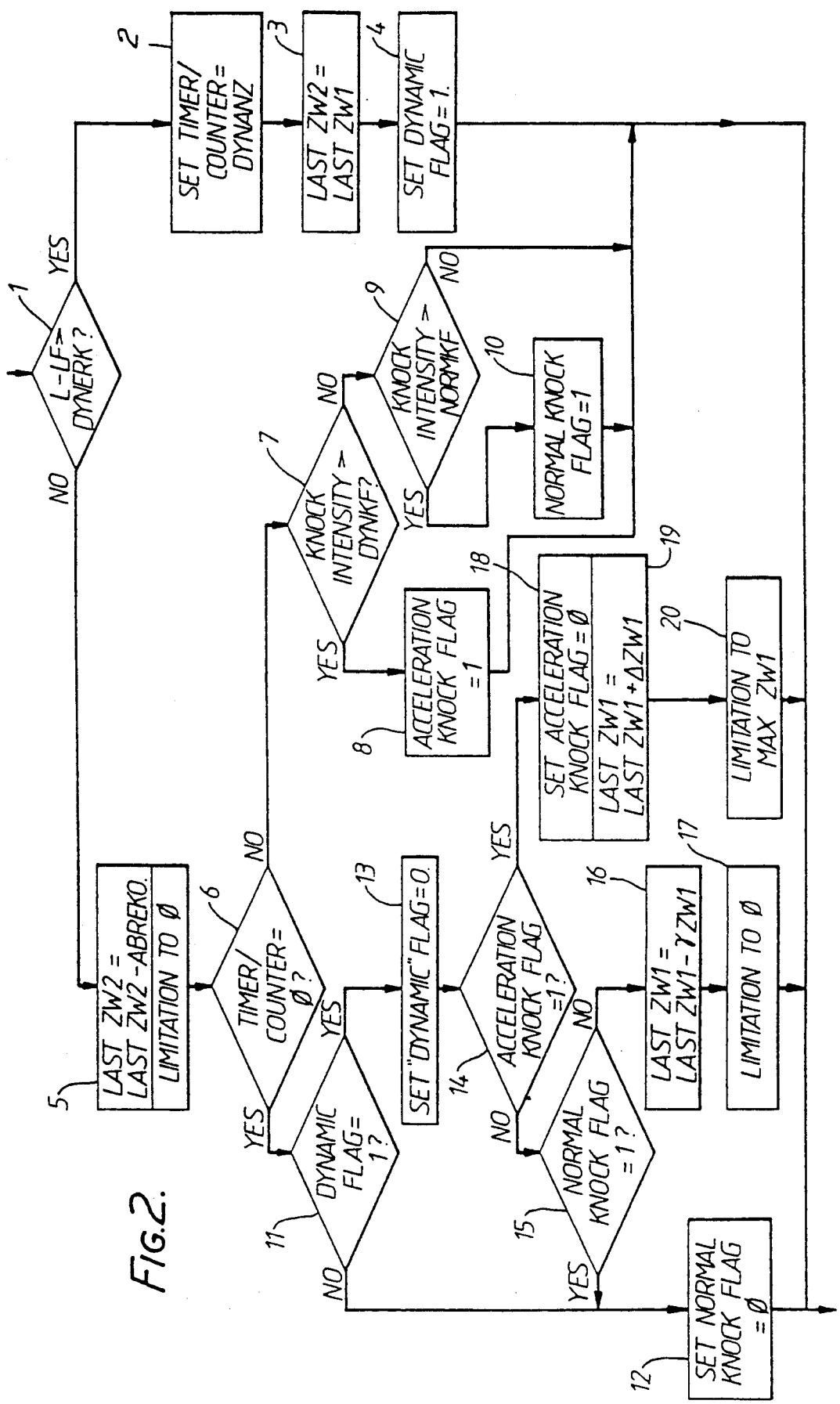

ADAPTIVE ACCELERATION KNOCK CONTROL

BACKGROUND OF THE INVENTION

The present invention relates to engine knock control systems in which an operating parameter such as the ignition timing is varied during dynamic operation i.e. acceleration, to prevent acceleration knocking.

At high cooling water and/or intake temperatures, audible acceleration knocking can occur in internal combustion engines if the load is increased very quickly, i.e. during dynamic engine operation. Knocking can be eliminated by retarding engine ignition. Therefore it has been proposed to temporarily retard engine ignition during dynamic engine operation to prevent the occurrence of acceleration knocking. In conventional knock-control systems if dynamic engine operation is detected the ignition is retarded by a fixed amount. However, retarding ignition has an adverse affect on engine response (gas emission) and therefore it is desirable to retard ignition as little as possible. The known systems for preventing acceleration knocking retard the ignition each time dynamic engine operation occurs, regardless of the ambient conditions. Thus, there may be instances when the ignition is retarded unnecessarily or more than is necessary.

SUMMARY OF THE INVENTION

The object of the present invention is to overcome this disadvantage and optimize the amount by which the ignition is retarded during each engine operation.

The present invention provides a method of mitigating acceleration knocking in internal combustion engines comprising the steps of sensing acceleration of the engine and changing a particular engine operating parameter in response to the sensing of acceleration, characterized by the steps of detecting the occurrence of knocking during acceleration and adjusting the amount of change of the parameter for the next acceleration depending on whether or not acceleration knocking is occurring.

Preferably the operating parameter is the ignition timing which is retarded in response to the sensing of acceleration.

Preferably the detecting step includes examining the intensity of acceleration knocking and adjusting the amount of retardation or change of some other operating parameter in dependence on the intensity. The amount of change is preferably adjusted when the knock intensity is outside a predetermined range. The knock intensity may be examined at regular intervals during a predetermined time after the sensing of acceleration.

The method is applicable to diesel engines as well as spark ignition engines. In diesel engines the injection timing is adjusted to mitigate knocking.

The method of the invention as applied to a spark ignition engine ensures that during dynamic operation the ignition angle is retarded just enough to avoid knocking combustion. The method is adaptive in that the amount of retardation is optimized for the ambient conditions present during each engine operation (for example intake air temperature, cooling water temperature, fuel quality, deposits in the combustion space etc.)

A particular advantage is that a better engine response can be achieved, particularly during warm running and when using knock resistant fuel.

For example, if a driver changes from normal fuel to knock-resistant fuel, the retardation of the ignition necessary for each acceleration may be significantly less. According to the invention, next time the engine is operated (i.e. the vehicle is driven) the amount of retardation will be adjusted at every instance of acceleration until the amount of retardation during acceleration reaches an optimum value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1(a) to (e) illustrate the method of the invention graphically and

FIG. 2 is a flow chart detailing the steps of the method.

DESCRIPTION OF A PREFERRED EMBODIMENT

The illustrated embodiment of the present invention is intended for temporarily retarding ignition only during dynamic engine operation. A normal knock control system of known type controls the ignition angle at other times. The method thus forms part of a larger engine knock control system which would typically be implemented by a computer. The method may be carried out as a series of steps as illustrated in FIG. 2 of the drawings and may be controlled by clock pulses from a microprocessor.

The steps shown in the flowchart of FIG. 2 can be grouped into three stages, indicated by routes I, II and III on the flowchart. During the first stage I it is established whether or not dynamic engine operation is taking place. If dynamic engine operation is taking place, the ignition timing for the next following ignition cycles is retarded by an amount determined in a manner to be described below. Then the amount of retardation will be decreased during a defined time depending on the amount of retardation. During the second stage II the intensity of any knocking occurring is examined. During stage III the amount of retardation is changed if necessary, for the next dynamic operation or acceleration, so as to bring the knock intensity closer to the knock limit. Each of these three stages may be carried out for each cylinder of the engine. The individual steps in each of stages I, II and III will now be described in further detail.

Dynamic engine operation occurs when the engine load increases very quickly. In the embodiment of the invention described herein the manifold pressure is used as a measure of engine load. The manifold pressure is measured at regular intervals, preferably at a certain crankshaft angle with the working stroke of each cylinder. A sample and hold circuit may be used for this purpose. The interval $\Delta T$ is equal to the interval between two dynamic engine operations. When the manifold pressure or engine load is increasing, as indicated in the graph "L" shown in FIG. 1(a) the engine load is low pass filtered to produce the curve LF also shown in FIG. 1(a). If the "steps" in the graph L are very steep this indicates that the engine is in dynamic operation. The "steepness" of the steps is determined by calculating the difference between the engine load and the filtered engine load, i.e. the difference between the graphs of L and LF.

Thus, at step 1 of the flow chart of FIG. 2 the question is asked whether dynamic engine operation is occurring by examining the values of L and LF. DYNERK is a set value of L−LF above which dynamic engine operation is said to be occurring. If L−LF>DYNERK, step 2 is then carried out.

At step 2 a timer/counter is set to an initial value DYNANZ and immediately begins to run down from that value. At step 3 a value LAST/ZW1 is fed into a random access memory (RAM) LAST ZW2. LAST ZW2 stores values for the retardation of the ignition during dynamic engine operation. Thus once dynamic engine operation has been established LAST ZW1 is fed into LAST ZW2 and the ignition timing is retarded by the amount LAST ZW1. (It will be understood that during normal conditions the engine would operate using stored characteristic values of ignition angle for certain conditions of speed and load.) At step 4 a flag is set to indicate that dynamic engine operation is occurring. The steps are followed through in sequence at each clock pulse. Steps forming the remainder of the knock control system are carried out after step 4 and the system begins again at step 1 at the next clock pulse. This completes stage I of the operation.

If at the next clock pulse the equation L−LF >DYNERK is still satisfied, steps 2 to 4 are simply carried out again.

If L−LF<DYNERK, step 5 is carried out. Here, the value in the RAM LAST ZW2 is decremented by a set amount ABREKO. This step is carried out at each next clock pulse while L−LF<DYNERK, with the limitation that LAST ZW2 is not reduced below zero. Thus, after an initial sharp increase in engine load the ignition is retarded by the amount LAST ZW1, and then the amount of retardation is gradually reduced to zero so that the ignition angle returns to its normal (non-dynamic) value.

At step 6 the content of the timer/counter is examined. If the time defined by DYNANZ has not expired the next step carried out is step 7, which begins stage II of the operation. Here the intensity of any knocking which is occurring is examined. At step 7 a comparison is made between the measured knock intensity and a set value DYNKF. If the knock intensity is greater than DYNKF, an acceleration knocking flag is set to 1 at step 8. If the knock intensity is less than DYNKF, the knock intensity is compared to a second set value NORMKF at step 9. NORMKF indicates that the engine is operating at the knock limit, as desired. Any knocking requiring corrective action will have an intensity greater than NORMKF. If the knock intensity is smaller than NORMKF this indicates that the engine is operating below the knock limit. If the knock intensity is smaller than DYNKF but greater than NORMKF a normal knocking flag is set to 1 at step 10.

Thus, at each clock pulse during the time DYNANZ and once L−LF is no longer greater than DYNERK, the intensity of knocking is examined.

Once the time DYNANZ has expired, the answer to the question at step 6 will be yes and the next step carried out will be step 11, which begins stage III of the operation. At step 11 the "Dynamic" flag is examined. If dynamic operation is not in progress the only further step is to set the normal knocking flag to zero at step 12. If dynamic operation is occurring then after the dynamic flag has been examined at step 11 it is set to zero at step 13.

At step 14 the acceleration knock flag is examined. If this flag has not been set the normal knock flag is examined at step 15. If the normal knock flag has been set it is simply set to zero at step 12. If the normal knock flag is not set i.e. the knock intensity is below the knock limit, the amount of retardation of the ignition defined by ZW1 is adjusted since the retardation adversely affects the gas emission. It is desirable for the amount of retardation to be optimized so that it is as small as possible whilst ensuring that knocking above the defined knock limit does not occur. If the knock intensity is equal to or below NORMKF it may be possible to lessen the amount of retardation without knocking occurring. Therefore, if the knock intensity is equal to or below NORMKF, the value of ZW1 is decremented by δ ZW1 at step 16, subject to the limitation to zero at step 17 to ensure that the ignition is not brought forward from its normal characteristic angle ALFA_Z.

If it is found at step 14 that acceleration knocking of intensity greater than DYNKF is occurring the amount of retardation of the ignition ZW1 is adjusted. If knocking is occurring the ignition must be retarded more to prevent further knocking. Thus, at step 18 the acceleration flag is reset to zero and at step 19 the value of ZW1 is increased by ΔZW1, subject to an upper limit at step 20.

At the next clock pulse if the answer at step 1 is NO, steps 5 and 6 will be carried out but this time at step 7 the dynamic flag will be at zero and steps 13 to 20 will not be carried out.

At the next "step" on the graph illustrated in FIG. 1(a) when L−LF>DYNERK again, i.e. at the next dynamic operation, or acceleration the new value of ZW1 obtained at steps 13 to 20 will be set for retarding the ignition, and stages I, II and III will be repeated. If it is determined during stage II that the knock intensity is still greater than DYNKF or smaller than NORMKF using the new value of ZW1, ZW1 will be increased or decreased during stage III.

Thus, ZW1 will be adjusted every time the condition L−LF>DYNERK is satisfied until the knock intensity is between NORMKF and DYNKF.

In other words the value of ZW1 is adjusted at every dynamic operation until an optimum value is reached.

FIGS. 1(a) to (e) illustrate the method of the invention graphically. FIG. 1(a) shows the relationship between the values L and LF examined at step 1 in FIG. 2. In the first two intervals ΔT shown in FIG. 1(a) L−LF>DYNERK is satisfied at the sampling time. In the third interval ΔT the value L−LF<DYNERK. It will be appreciated that in actual practice dynamic engine operation would continue for several seconds. Thus ΔT may be up to 10 seconds. FIG. 1(b) illustrates the value of the timer/counter. At the clock pulse corresponding to the measuring point on the graph for L the value in the timer/counter 13 is set to DYNANZ and then runs down to zero. If L−LF>DYNERK is satisfied for several subsequent timing pulses the value in the timer/counter is held at DYNANZ until L−LF<DYNERK.

It will be noted that DYNANZ defines a time "window" during which knocking is detected. The frequency of clock pulses and the length of time DYNANZ must be chosen so as to ensure that knocking is efficiently detected.

FIG. 1(c) shows the value of LAST ZW2 changing with time. The value LAST ZW2 is decremented as the timer/counter is decremented. The length of time taken for the ignition angle to return to the normal characteristic value ALFA-Z varies depending on the initial value of LAST ZW2 which is LAST ZW1. The time taken for the ignition angle to return to normal is indicated in FIG. 1(c) as AUFREG.

FIG. 1(d) illustrates the setting of the acceleration knock flag and the normal knock flag. The solid line indicates the acceleration knock flag and the dotted line indicates the normal knock flag. In the first interval ΔT shown, acceleration knocking of intensity greater than DYNKF is detected and the acceleration knock flag is set at some time during the period DYNANZ. It is reset to zero at step 18 after the time DYNANZ has expired. In the second interval, the intensity of knocking determined during DYNANZ is greater than NORMKF but less than or equal to DYNKF so that the normal knock flag is set (step 10). The normal knock flag is reset at step 12 after DYNANZ has expired.

FIG. 1(e) shows the variation of ZW1 with time. Acceleration knocking is detected during the first measuring interval Δ T as indicated by the flag in FIG. 1(d) and therefore after the time DYNANZ at which steps 11 through 20 are carried out, the value of ZW1 is increased by ΔZW1. During the second measuring interval shown in FIG. 1 the normal knock flag is set and no further adjustment of ZW1 is required.

It is clear from the above description that the method of the invention is adaptive for the ambient conditions occurring during each operation of the engine. Each time it is sensed that the engine is in dynamic operation the value of ZW1 is altered until the engine is temporarily retarded just enough to avoid knocking combustions of a selectable intensity. When starting the engine the adaptive value LAST ZW1 is set to a defined initial value.

An important point to note is that the selectable intensity mentioned above, i.e. DYNKF can be changed so as to adapt the method for different engines for example. Thus the method is versatile and can be used in many applications.

It will be understood that each of the elements described above, or two or more together, may also find a useful application in other types of methods differing from the types described above.

While the invention has been illustrated and described as embodied in an adaptive acceleration knock control, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of mitigating acceleration knocking in internal combustion engines comprising the steps of sensing acceleration of an internal combustion engine; detecting occurrence of a knocking during the acceleration; and adjusting an amount of change of an engine operation parameter for a next acceleration depending on whether or not the knocking during acceleration is occurring.

2. A method as defined in claim 1, wherein said adjusting step includes adjusting an ignition timing which is retarded in response to the sensing of acceleration.

3. The method as defined in claim 2, wherein said adjusting step includes increasing an amount of retardation when a knock intensity exceeds an upper predetermined value, and decreasing the amount of retardation when the knock intensity is below a lower predetermined value.

4. A method as defined in claim 1, wherein said detecting step includes examining an intensity of the knocking during acceleration, said adjusting step including adjusting the amount of change of said engine operation parameter in dependence on the detected intensity of the knocking during acceleration.

5. A method as defined in claim 4, wherein said examining step includes examining the intensity of the knocking during acceleration at regular intervals during a predetermined time after the sensing of acceleration.

6. A method as defined in claim 4, wherein said adjusting step includes adjusting the amount of change of the engine operation parameter when the intensity of the knocking during acceleration is outside a predetermined range.

7. A method as defined in claim 6, wherein the predetermined range has a lower limit selected such that only the knocking which does not require corrective action has an intensity below the lower limit.

8. A method as defined in claim 6, wherein the predetermined range has an upper limit selected such that only knocking caused by the effects of the acceleration has an intensity exceeding said upper limit.

* * * * *